(12) United States Patent
Liu (10) Patent No.: US 11,605,080 B2
(45) Date of Patent: Mar. 14, 2023

(54) METHOD AND SYSTEM OF TRANSFERRING CRYPTOCURRENCY CREDITS THROUGH A BLOCKCHAIN WITH LEAF BLOCKS

(71) Applicant: Tingkai Liu, Aurora, IL (US)

(72) Inventor: Tingkai Liu, Aurora, IL (US)

( * ) Notice: Subject to any disclaimer, the term of this patent is extended or adjusted under 35 U.S.C. 154(b) by 300 days.

(21) Appl. No.: 17/086,443

(22) Filed: Nov. 1, 2020

(65) Prior Publication Data

US 2022/0138745 A1    May 5, 2022

(51) Int. Cl.

| | |
|---|---|
| *G06Q 20/40* | (2012.01) |
| *H04L 9/32* | (2006.01) |
| *H04L 9/14* | (2006.01) |
| *H04L 9/06* | (2006.01) |

(52) U.S. Cl.
CPC ......... *G06Q 20/401* (2013.01); *H04L 9/0637* (2013.01); *H04L 9/14* (2013.01); *H04L 9/3242* (2013.01); *G06Q 2220/00* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 2019/0392392 | A1* | 12/2019 | Elden | H04L 9/3239 |
| 2020/0058055 | A1* | 2/2020 | Simha | G06Q 20/3825 |
| 2020/0099530 | A1* | 3/2020 | Khatib | G06K 9/6267 |
| 2021/0342836 | A1* | 11/2021 | Cella | H04L 67/12 |

* cited by examiner

*Primary Examiner* — Kaveh Abrishamkar (57) ABSTRACT

A method of transferring cryptocurrency credits employs leaf blocks to transfer cryptocurrency credits which are settled by cryptocurrency through blockchain transaction(s). It comprises: maintaining two types of accounts—one for cryptocurrency and the other for cryptocurrency credits; creating at least a leaf block, by a sending financial institution, containing a plurality of business transactions that intend to transfer customers' cryptocurrency credits to customers at a receiving financial institution; calculating a mathematical summary of said leaf block; creating at least a blockchain transaction tying to said leaf block through said mathematical summary serving as a settlement to said leaf block; submitting said blockchain transaction to a blockchain; sharing said leaf block with the receiving financial institution; accessing said leaf block by the receiving financial institution, validating it and crediting transaction amounts in it to corresponding customer accounts at the receiving financial institution. A system configured to implement said method.

14 Claims, 6 Drawing Sheets

METHOD AND SYSTEM OF TRANSFERRING CRYPTOCURRENCY CREDITS THROUGH A BLOCKCHAIN WITH LEAF BLOCKS

FIELD OF THE INVENTION

The invention pertains to the field of payment schemes. More particularly, the invention pertains to a computer-implemented method and system of transferring cryptocurrency credits through a blockchain with leaf blocks.

BACKGROUND OF THE INVENTION

In recent years, blockchain technology gained lots of attention. One potential and promising application of blockchain is payment solution. People often compare transaction speed of a blockchain network like Bitcoin with a payment network such as MasterCard. However, it is worth noting that such comparison is unfair. Cryptocurrency to a blockchain network is what physical cash to fiat monetary systems. Most transactions on a payment network are not physical cash transaction in nature. They are transactions of credits. The actual movement of physical cash (fund) is far behind the transactions through complex clearing and settlement processes. But every transaction of cryptocurrency on a blockchain network is a "physical cash" transaction in nature. The high efficiency of fiat financial systems is based on credit transactions not the cash transactions. Consumers care more about the ability to use money (in forms of credits) than the actual possession of physical cash. Nevertheless, blockchain networks require consumers to possess "physical cash" (which is cryptocurrency in blockchain networks) in order to use the money. Therefore, there is a need in the art to introduce a credit form of cryptocurrency to improve overall efficiency for business transactions in blockchain networks.

The advantages of blockchain technology includes decentralization, immutability, security, anonymity and transparency. However, the technology has not been widely adopted due to several of its limitations. One of them is scalability or the uncertainty of scalability. The blockchain like bitcoin only processes less than 7 transactions per second. Although new technologies have greatly improved the throughput of blockchains, it's still uncertain how scalable they can be. What is worse, business owners have no control over the scalability of a blockchain, which further restrict their willingness to adopt such technologies. Second limitation may be that it's too difficult for consumers to adopt, or even understand blockchain and cryptocurrency. The access to any blockchain currency is controlled based on possession of what is called electronic wallet or simply "wallet", which is a pair or pairs of public key and private key. If a wallet is lost, discarded, or stolen, the rightful owner cannot recover the associated currency, and no one can help. The concerns of such situations further increase the reluctance of consumers to use cryptocurrency. Finally, legal compliance is a big concern for cryptocurrency. In financial industrial, it's required by law to fight against fraud, money laundry, and terrorist financing. Unfortunately, blockchain technologies facilitate all such activities. Therefore, there is a need in the art for a method and system that preserve all advantages of blockchain technologies, while providing features of high scalability, government regulation compliance and user-friendly interface for consumers.

SUMMARY OF THE INVENTION

The present disclosure provides a method and system of transferring cryptocurrency credits using a blockchain with leaf blocks. It employs leaf blocks to transfer cryptocurrency credits and meanwhile uses blockchain transaction(s) as a settlement, which allows consumers to transfer cryptocurrency credits without knowing anything about blockchain technologies in a similar way they use fiat transferring applications such as Chase QuickPay® or Zelle®.

According to an embodiment of the present invention, a method of transferring cryptocurrency credits includes the following steps: (1) maintaining at least two types of accounts—one type of blockchain accounts for cryptocurrency and the other type of customer accounts for cryptocurrency credits; (2) creating at least a leaf block, by a sending financial institution, which includes a plurality of business transactions that intend to transfer customers' cryptocurrency credits to customer accounts at a receiving financial institution where such inclusion does not limits to direct appearance but also includes business transactions that are directly or indirectly referred in said leaf block; (3) calculating a mathematical summary for said leaf block by the sending financial institution, where in most cases a mathematical summary is a hash value of said leaf block; (4) creating at least a blockchain transaction, by the sending financial institution, corresponding to said leaf block addressing to blockchain account(s) of the receiving financial institution where total cryptocurrency amount of said blockchain transaction is great enough to settle cryptocurrency credits that are intended to be transferred through said business transactions, and at least a part of said mathematical summary is referred in transaction memo(s) or any other data field(s) of said blockchain transaction; (5) submitting said blockchain transaction, by the sending financial institution, to a blockchain network to be written on a blockchain; (6) sharing said leaf block by the sending financial institution with the receiving financial institution; (7) accessing said leaf block by the receiving financial institution after said blockchain transaction is available; and (8) validating said leaf block and crediting transaction amounts in it to corresponding customer accounts by the receiving financial institution after said blockchain transaction is confirmed. At the conclusion of these steps, cryptocurrency credits of customers at one financial institution are transferred to customers at another without requirement of customers knowing any blockchain technologies.

According to an embodiment of the present invention, a system of transferring cryptocurrency credit comprises at least a database at each participated financial institution, an application server at a sending financial institution, a blockchain network, and an application server at the receiving financial institution. All these components are configured to implement said method of transferring cryptocurrency credits.

DETAILED DESCRIPTION OF THE INVENTION

Glossary of Terms

Plurality means more than one.

Blockchain is a growing list of records, called blocks, that are linked sequentially using cryptography, where each block contains a cryptographic hash of the previous block, a timestamp, and transaction data. For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. By design, it is resistant to modification of the data.

Cryptocurrency is a digital or virtual currency that is secured by cryptography, which makes it nearly impossible to counterfeit or double-spend. Cryptocurrencies are decentralized based on blockchain technology—a distributed ledger enforced by a disparate network of computers.

Credit is the opposite view of debt meaning the amount of money owed. Credit and debt are two sides of the same coin. For instance, when Bob deposit $100 to ABC bank, he gets a balance of $100. That balance to the bank is a debt, but to Bob is a credit, both of which mean the same thing—the bank owes Bob $100—but from different points of view. To credit means to reduce a debt. For example, when you return a blanket of $100 purchased by credit card and the bank credit you $100 back, it means the bank will reduce your debt by $100.

Cryptocurrency credit is credit of cryptocurrencies instead of any fiat currencies.

Financial institution is an entity engaged in a business of dealing with financial, monetary, cryptocurrency or credit transactions. Any entity maintaining customers' cryptocurrency credits are defined as financial institutions in context of the present invention. An entity is a person, department, team, corporation, cooperative, partnership, or other group with whom it is possible to conduct business.

Blockchain account is an account a user used to store and transfer cryptocurrency. Typically, it is a pair of public key and private key. It can be pairs of public keys and private keys.

Customer account is an account maintained by a financial institution for a customer.

Business transactions refers to transactions for daily business operations, typically not on blockchain.

Method of Transferring Cryptocurrency and Cryptocurrency Credits Through Blockchain with Leaf Blocks The present invention generally relates to transfer of cryptocurrency credits using blockchain technologies. It is worth noting that cryptocurrency in blockchain is analogue to physical cash in a fiat monetary system, and that transferring credits is much more efficient than transferring cash directly. The present invention employs leaf blocks to transfer cryptocurrency credits and meanwhile uses blockchain transaction(s) to transfer cryptocurrency as a settlement.

Any format of leaf blocks can be used as long as they include or refer to a plurality of business transactions that intend to transfer cryptocurrency credits to customers at receiving financial institution(s). The format of leaf blocks described in the present disclosure are used to exemplified leaf blocks, not to limit the format of leaf blocks. Connection of leaf block(s) to blockchain transaction(s) is not limited to 1-to-1 relationship. It can be 1-to-many, many-to-1, or many-to-many relationship. The key point is that the account of cryptocurrency transferred in the blockchain transaction(s) of a connection is great enough to settle the amount of cryptocurrency credits transferred in the leaf blocks of the connection. Since 1-to-1 connection of leaf block to blockchain transaction is the simplest and most efficient way, the present disclosure only exemplifies such connection, which cannot be used to exclude other possibilities.

Figure 1:
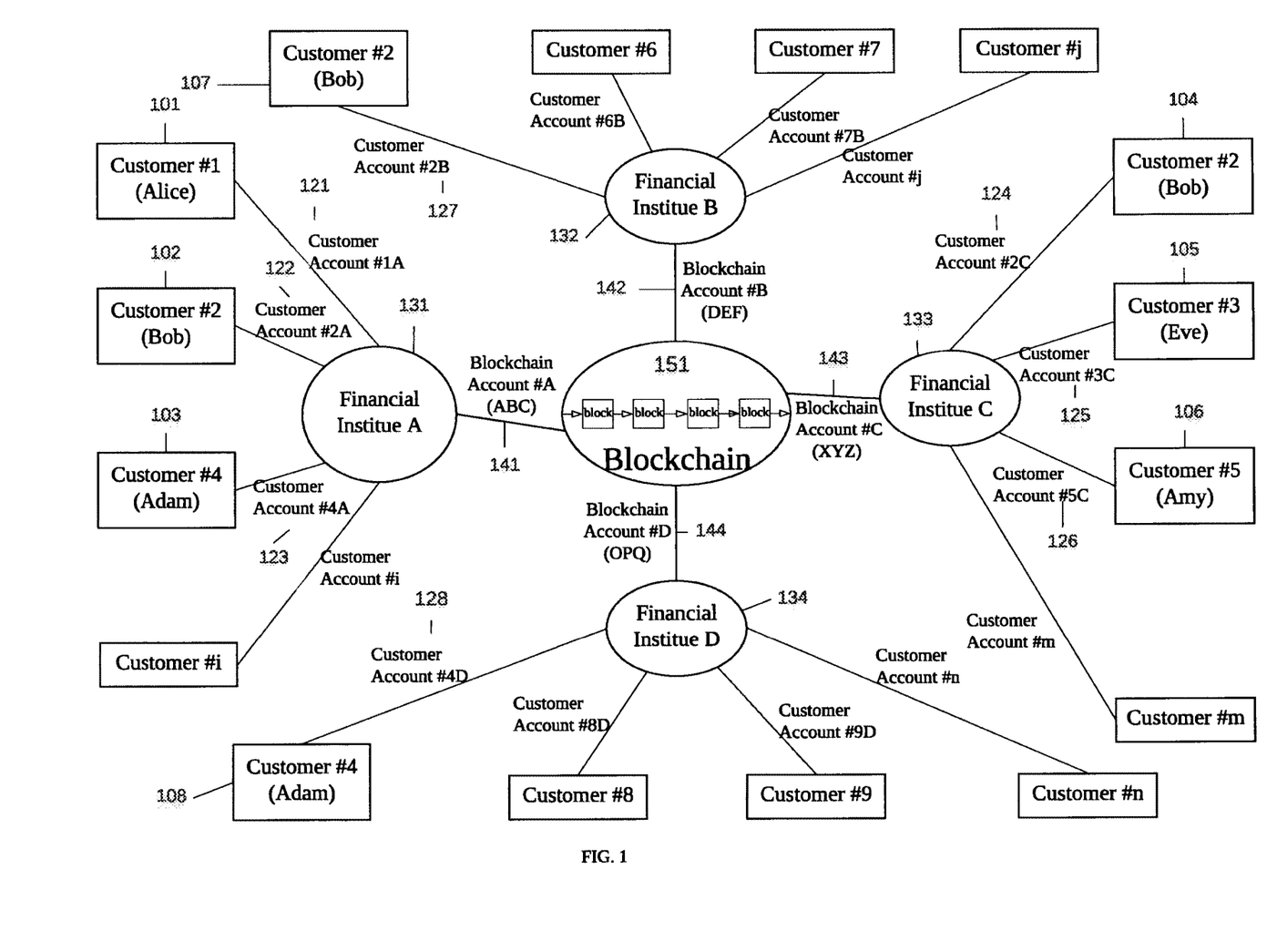
FIG. 1 is a diagram of account setups showing that customers are tied to financial Institutions through customer accounts and financial institutions are linked to one another through blockchain using blockchain accounts.
Figure 4:
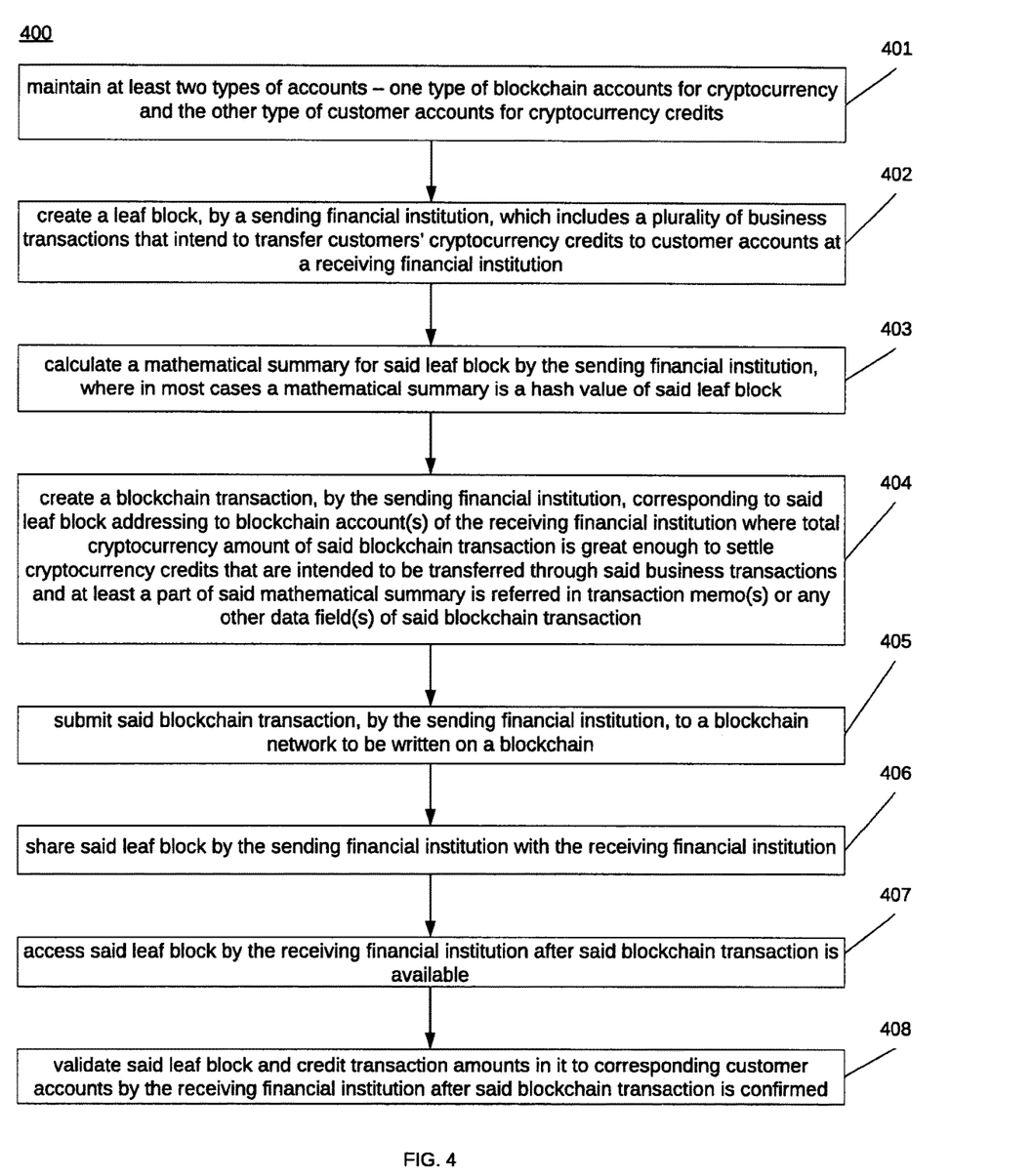
FIG. 4 is a flowchart of a method of transferring cryptocurrency credit using blockchain with leaf blocks.

According to an embodiment of the present invention, a method of transferring cryptocurrency and its credit includes the following steps as show in FIG. 4:

Step 401—Financial institutions maintain two types of accounts: one type of blockchain accounts for the purpose of holding and transferring cryptocurrency, and the other type of customer accounts for the purpose of cryptocurrency credit maintenance and transfer. FIG. 1 is a diagram of account setups showing that customers (101-108) are tied to financial institutions (131-134) through customer accounts (121-128) and financial institutions are linked to one another through blockchain (151) using blockchain accounts (141-144) in blockchain transactions.

Figure 2:
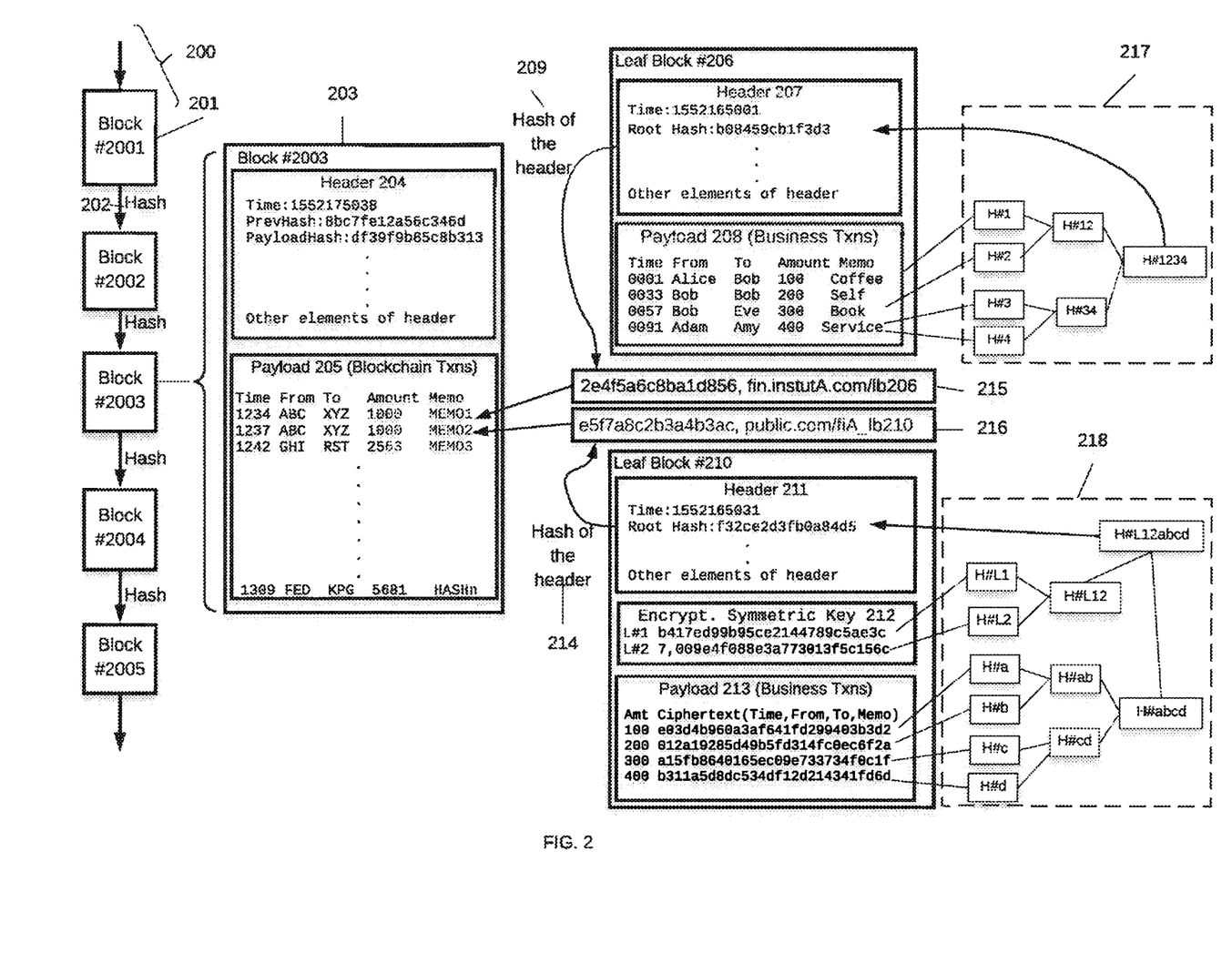
FIG. 2 is a diagram of a blockchain with leaf blocks showing that a plurality of business transactions are written in leaf blocks and then are summarized to one blockchain transaction per leaf block.

Step 402—Sending financial institution creates a leaf block including a plurality of business transactions that intend to transfer cryptocurrency credits to customers at a receiving financial institution. Typically, a leaf block contains a payload and a header. The payload contains said business transactions. The header contains at least a mathematical summary of said payload which is known as a root hash of said payload. In FIG. 2, 206 and 210 show two examples of leaf blocks.

Step 403—Sending financial institution calculates a mathematical summary for said leaf block. Typically, a mathematical summary is a hash value of the header of said leaf block. Since the header of a typical leaf block has a root hash or mathematical summary of the payload of said leaf block, a mathematical summary of the header is also a mathematical summary of said leaf block.

Step 404—Sending financial institution creates a blockchain transaction corresponding to said leaf block addressing to blockchain account(s) of the receiving financial institution. The blockchain has following features: (a) total cryptocurrency amount of said blockchain transaction is great enough to settle cryptocurrency credits that are intended to be transferred through said business transactions of said leaf block; (b) at least a part of said mathematical summary of said leaf block is referred in transaction memo(s) or any other data field(s) of said blockchain transaction; and (c) favorably a unique resource identifier (URI) is incorporated in transaction memo(s) or any other data field(s) of said blockchain transaction referring to a location where said leaf block can be accessed. In the most straightforward scenario, total cryptocurrency amount of said blockchain transaction is slightly greater than or equals to the sum of cryptocurrency credits of all said business transactions inside said leaf block plus miming fee, which secures the settlement of said blockchain transaction to said leaf block. And said blockchain transaction includes a memo (or any other data element(s) serving as a memo) which contains at least a data field for holding the hash value or part of the hash value of said leaf block, and favorably a data field for storing unique resource identifier (URI) pointing to the location of corresponding leaf block. In FIG. 2, the first blockchain transaction of Payload 205 corresponds to the leaf block 206 where the transaction amount 1000 equals to the sum of all transaction amount in the leaf block (100+200+300+400) assuming mining fee is zero, and MEMO1 (215) contains the hash value (209) of the header 207 of leaf block 206 and a URI pointing to a location where leaf block 206 can be accessed.

Step 405—Sending financial institution submits said blockchain transaction to miners to be written on a blockchain.

Step 406—Sending financial institution shares the leaf block with the receiving financial institution by placing it in a shared location or using any other approaches.

Step 407—After said blockchain transaction is available, the receiving financial institution accesses the leaf block possibly through the URI provided in the transaction memo.

Step 408—After said blockchain transaction is confirmed, the receiving financial institution validate said leaf block and credits transaction amounts in it to corresponding customer accounts.

At the conclusion of these steps, cryptocurrency credits of customers at one financial institution are transferred to customers at another without requirement of customers knowing any blockchain technologies.

Figure 5:
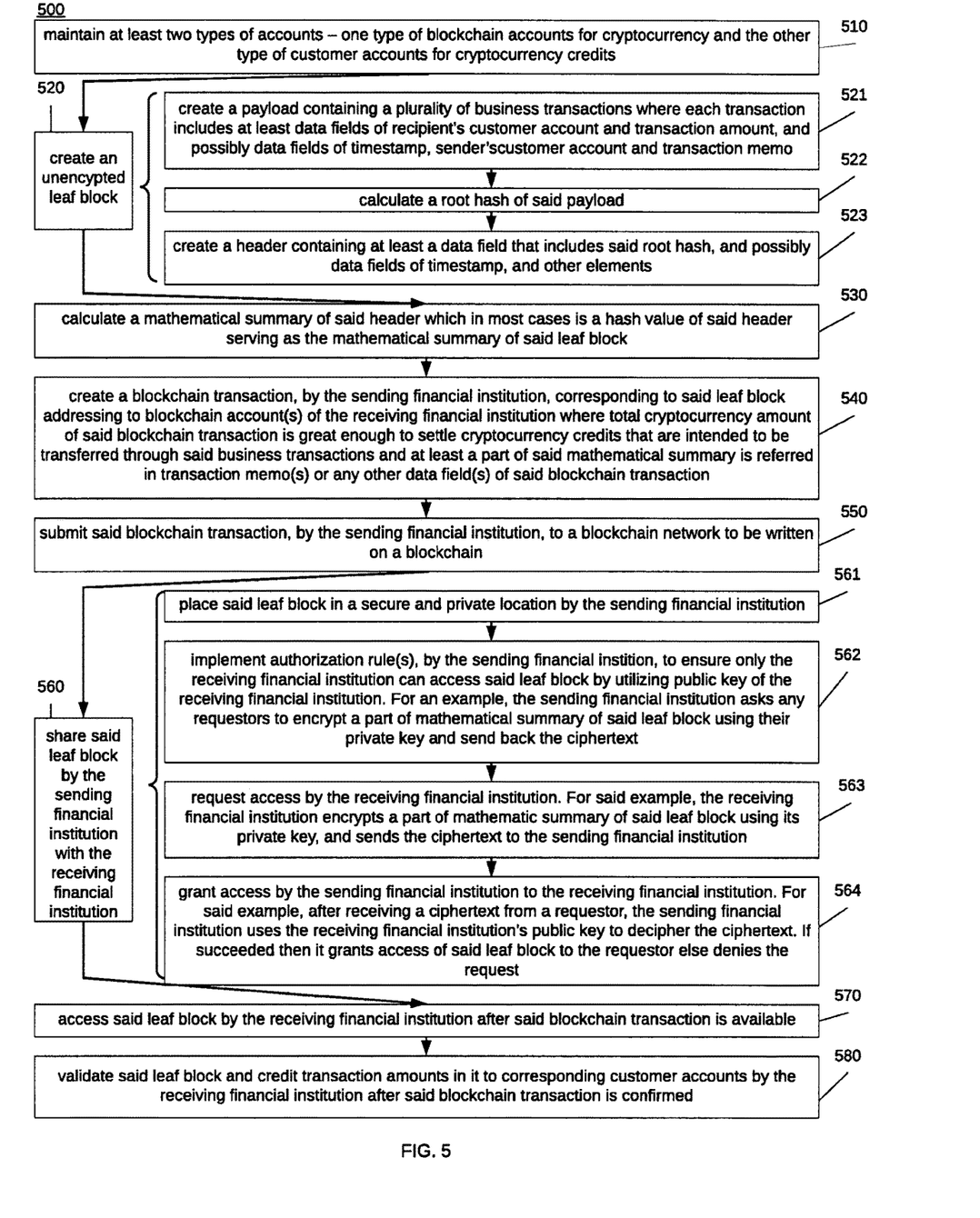
FIG. 5 is a flowchart of a method of transferring cryptocurrency credit using blockchain with unencrypted leaf blocks.

According to an embodiment of the present invention, a leaf block may be unencrypted. The detailed steps of such scenario are illustrated in FIG. 5. Notably, creating a leaf block further comprises the following steps:

Step 521—Sending financial institution creates a payload containing a plurality of business transactions where each transaction includes at least data fields of recipient's customer account and transaction amount, and possibly data fields of timestamp, sender's customer account and transaction memo.

Step 522—Sending financial institution calculates a root hash of said payload. While any techniques can be used, one common technique is Merkle Tree scheme that was detailed in Bitcoin technology specifications publicly available. Briefly, each transaction is hashed (H #1-H #4 of Box 217), then each pair of hashes is concatenated and hashed together (H #12 & H #34 of Box 217), and then repeat the steps until there is only one hash (H #1234 of Box 217, which is known as Merkle root) for the entire payload of the leaf block. The only one hash is used as the root hash of the header.

Step 523—Sending financial institution creates a header containing at least a data field that includes said root hash, and possibly data fields of timestamp, and other elements (207).

In unencrypted scenario, sharing said leaf block by the sending financial institution with the receiving financial institution further comprises the following steps:

Step 561—Sending financial institution places said leaf block in a secure and private location which is only accessible to authorized users.

Step 562—Sending financial institution implements authorization rule(s) to ensure only the receiving financial institution can access said leaf block by utilizing public key of the receiving financial institution. For an example, the sending financial institution asks any requestors to encrypt a part of mathematical summary of said leaf block using their private key and send back the ciphertext.

Step 563—The receiving financial institution requests access from the sending financial institution. For the example mentioned above, the receiving financial institution encrypts a part of mathematic summary of said leaf block using its private key and sends the ciphertext to the sending financial institution.

Step 564—Sending financial institution grants access to the receiving financial institution. For said example mentioned above, after receiving the ciphertext from a requestor, the sending financial institution uses the receiving financial institution's public key to decipher the ciphertext. If deciphering is succeeded, then it grants access of said leaf block to the requestor, else it denies the request.

In the conclusion of above four steps, the sending financial institutions ensures that only receiving financial institution can access said leaf block provided that the private key of the receiving financial institution is not compromised.

Figure 6:
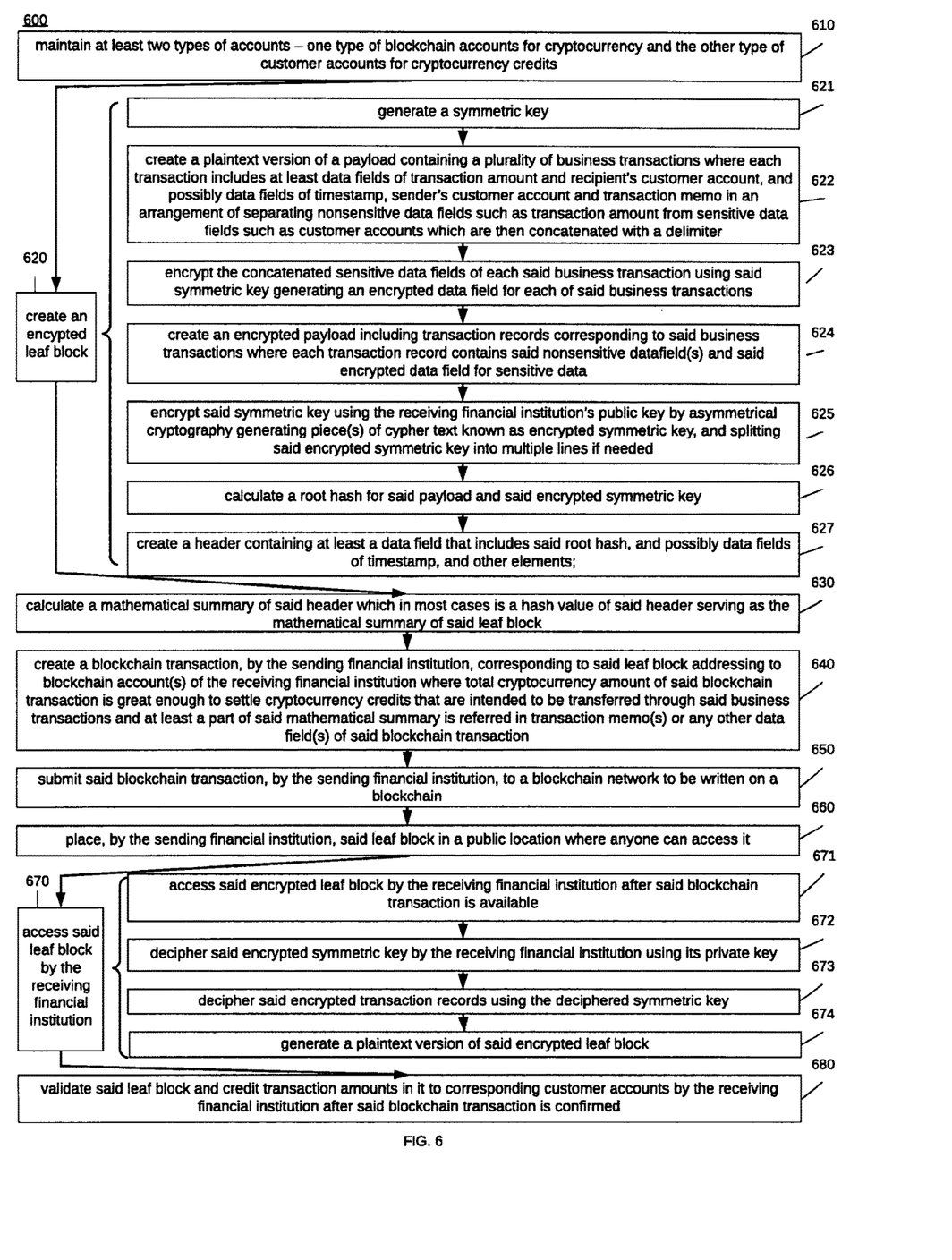
FIG. 6 is a flowchart of a method of transferring cryptocurrency credit using blockchain with encrypted leaf blocks.

According to an embodiment of the present invention, a leaf block may be encrypted. The detailed steps of such scenario are illustrated in FIG. 6. Notable, creating a leaf block farther comprises:

Step 621—Sending financial institution generates a symmetric key.

Step 622—Sending financial institution creates a plaintext version of a payload containing a plurality of business transactions where each transaction includes at least data fields of transaction amount and recipient's customer account, and possibly data fields of timestamp, sender's customer account and transaction memo. Non-sensitive data fields such as transaction amount are separated from sensitive data fields such as customer accounts. Sensitive data fields are concatenated with a delimiter. (Step 621 and Step 622 are switchable.)

Step 623—Sending financial institution encrypts the concatenated sensitive data fields of each said business transaction using said symmetric key generating an encrypted data field for each of said business transactions.

Step 624—Sending financial institution creates an encrypted payload including transaction records corresponding to said business transactions where each transaction record contains said non-sensitive data field(s) and said encrypted data field for sensitive data. Payload 213 of FIG. 2 shows an example of an encrypted payload.

Step 625—Sending financial institution encrypts said symmetric key using the receiving financial institution's public key by asymmetrical cryptography. If symmetric key is too long, it can be split into multiple pieces, which are then encrypted respectively. This step generates one pieces or multiple piece(s) of cypher text collectively known as encrypted symmetric key. If the encrypted symmetric key is too long, it may be split into multiple lines. Box 212 of FIG. 2 exemplifies an encrypted symmetric key. (Step 624 and Step 625 are switchable.)

Step 626—Sending financial institution calculates a root hash for said payload and said encrypted symmetric key. While any techniques can be used, one common technique is Merkle Tree scheme that was detailed in Bitcoin technology specifications publicly available. Briefly, each said transaction record or each line of said encrypted symmetric key is hashed, then each pair of hashes is concatenated and hashed together, and then repeat the steps until there is only one hash (which is known as Merkle root) for the entire payload and the encrypted symmetric key. It might be beneficial to hash business transactions and lines of encrypted symmetric key separately. Box 218 shows such a scheme: each transaction is hashed (H #a-H #d), then each pair of hashes is concatenated and hashed together (H #ab & H #cd), and then repeat the steps until there is only one hash (H #abcd, which is known as Merkle root) for the entire payload of the leaf block. Similarly, each line of said encrypted symmetric key is hashed (H #L1 & H #L2), then each pair of hashes is concatenated and hashed together, and then repeat the steps until there is only one hash (H #L12, which is known as Merkle root) for the entire encrypted symmetric key. Finally, the two Merkle roots are concatenated and hashed together to generate the root hash (H #L12abcd).

Step 627—Sending financial institution creates a header containing at least a data field that includes said root hash, and possibly data fields of timestamp, and other elements.

In an encrypted scenario, when the sending financial institution submits said blockchain transaction to a blockchain network to be written on a blockchain, miners of the blockchain may help validate the leaf block to ensure that (1) the transaction amount of cryptocurrency is enough to settle the cryptocurrency credits transferred by said leaf block, and/or (2) the root hash and the hash of leaf block were calculated correctly. Validation by miners is good to have but not required.

In an encrypted scenario, sharing said leaf block by the sending financial institution with the receiving financial institution may be through public channel(s). The sending financial institution may place said encrypted leaf in a public location. Although anyone can access the encrypted version of said leaf block, only the receiving financial institution with correct private key can decipher it. Specifically, accessing the plaintext version of said leaf block of by the receiving financial institution further comprises the following steps:

Step 671—The receiving financial institution accesses said encrypted leaf block.

Step 672—The receiving financial institution deciphers said encrypted symmetric key using its private key.

Step 673—The receiving financial institution deciphers said encrypted transaction records using the deciphered symmetric key.

Step 674—The receiving financial institution generates a plaintext version of said encrypted leaf block.

The conclusion of above 4 steps ensure only the receiving financial institution with correct private key can access the plaintext version of said leaf block.

Figure 3:
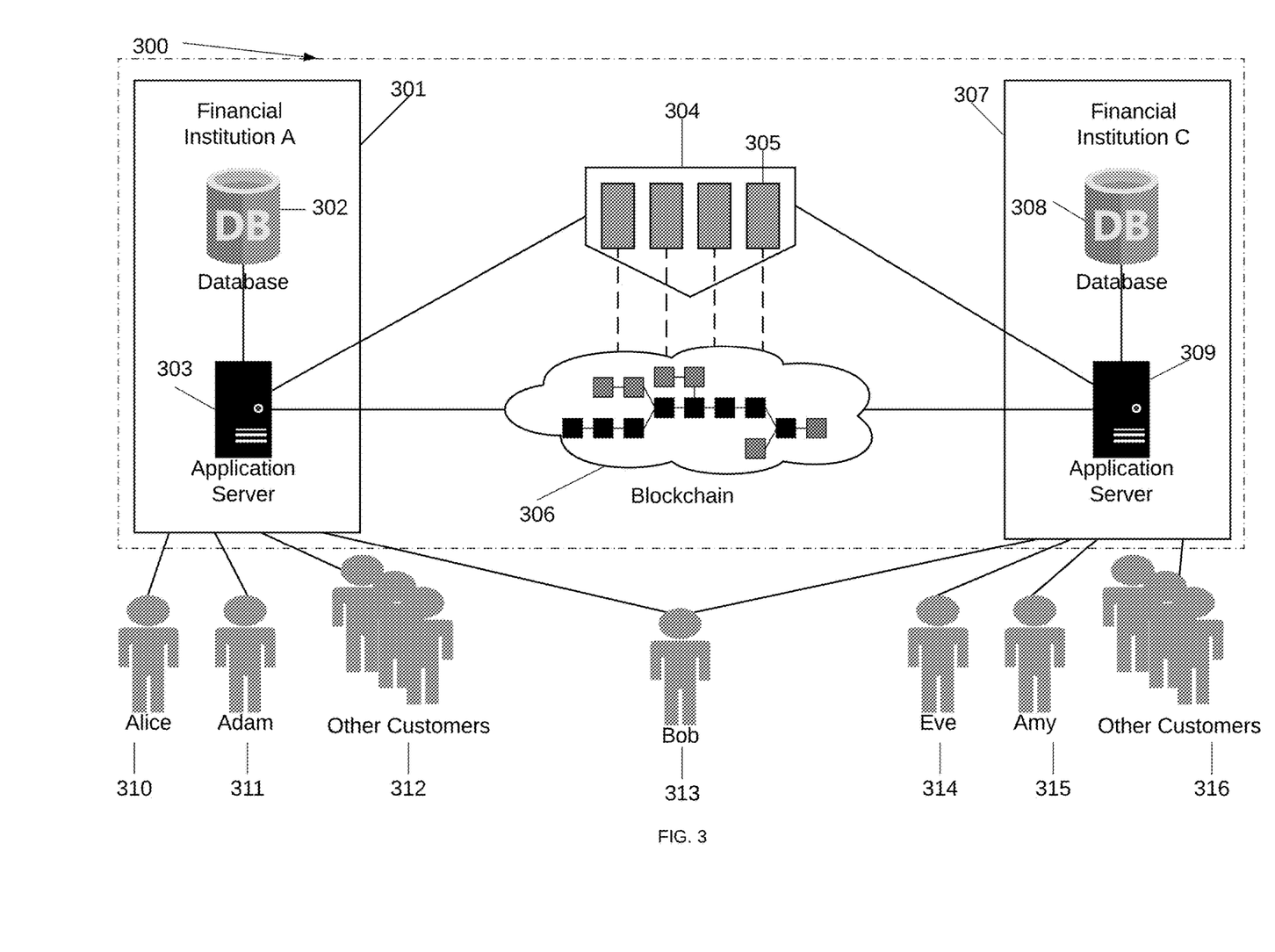
FIG. 3 is a system of a blockchain with leaf blocks that transfers cryptocurrency credits of customers from one financial institution to another and clears transactions using cryptocurrency that is transfer through blockchain.

System of Transferring Cryptocurrency Credits Through Blockchain with Leaf Blocks According to an embodiment of the present invention, a system of transferring cryptocurrency credit comprises at least a database at each participated financial institution (302 and 308), an application server at a sending financial institution (303), a data storage device or network location (304), a blockchain (306) network, and an application server at the receiving financial institution (309) as shown in FIG. 3.

Said database at each participated financial institution is configured to store blockchain accounts for cryptocurrency and customer accounts for cryptocurrency credits, and possibly customer profiles and transaction details.

Said application server at a sending financial institution is configured to:
  create at least a leaf block which includes a plurality of business transactions that intend to transfer customers' cryptocurrency credits to customer accounts at a receiving financial institution,
  calculate a mathematical summary for said leaf block where in most cases a mathematical summary is a hash value of said leaf block,
  create at least a blockchain transaction corresponding to said leaf block addressing to blockchain account(s) of the receiving financial institution where total cryptocurrency amount of said blockchain transaction is great enough to settle cryptocurrency credits that are intended to be transferred through said business transactions and at least a part of said mathematical summary is referred in transaction memo(s) or any other data field(s) of said blockchain transaction,
  incorporate a unique resource identifier (URI) in transaction memo(s) or any other data field(s) of said blockchain transaction referring to a location where said leaf block can be accessed,
  submit said blockchain transaction to a blockchain network to be written on a blockchain, and share said leaf block with the receiving financial institution.

Said blockchain network that can be used to write said blockchain transaction.

Said data storage device or network location is configured to store said leaf block and to share said leaf block with the receiving financial institution.

Said application server at the receiving financial institution is configured to access said blockchain transaction and said leaf block, and to validate said leaf block and credit transaction amounts in it to corresponding customer accounts.

According to an embodiment of the present invention, the application server at the sending financial institution may be configured to create an unencrypted leaf block, which is further configured to
  create a payload containing a plurality of business transactions where each transaction includes at least data fields of recipient's customer account and transaction amount, and possibly data fields of timestamp, sender's customer account and transaction memo,
  calculate a root hash of said payload, while any techniques of which can be used, one common technique is Merkle Tree scheme where each transaction is hashed, then each pair of hashes is concatenated and hashed together, and then repeat the steps until there is only one hash (which is known as Merkle root) for the entire payload of the leaf block,
  create a header containing at least a data field that includes said root hash, and possibly data fields of timestamp, and other elements, and
  calculate a mathematical summary of said header which in most cases is a hash value of said header serving as the mathematical summary of said leaf block.

According to an embodiment of the present invention, the systems may be configured to share a leaf block securely and privately. If this approach is used, said application server at the sending financial institution is further configured to place said leaf block in said data storage device or network. Said data storage device or network is further configured to implement authorization rule(s) to ensure only the receiving financial institution can access said leaf block by utilizing public key of the receiving financial institution. For an example, the sending financial institution asks any requestors to encrypt a part of mathematical summary of said leaf block using their private key and send back the ciphertext. Said application server at the receiving financial institution is further configured to request access from the sending financial institution. For said example, the receiving financial institution encrypts a part of mathematic summary of said leaf block using its private key and sends the ciphertext to the sending financial institution. Said application server at the sending financial institution is further configured to grant access to the receiving financial institution. For said example, after receiving the ciphertext from a requestor, the sending financial institution uses the receiving financial institution's public key to decipher the ciphertext. If succeeded, it grants access of said leaf block to the requestor, else it denies the request. Said application server at the receiving financial institution is further configured to access said leaf block.

According to an embodiment of the present invention, the application server at the sending financial institution may be configured to create an encrypted leaf block, which is further configured to generate a symmetric key;
create a plaintext version of a payload containing a plurality of business transactions where each transaction includes at least data fields of transaction amount and recipient's customer account, and possibly data fields of timestamp, sender's customer account and transaction memo in an arrangement of separating non-sensitive data fields such as transaction amount from sensitive data fields such as customer accounts which are then concatenated with a delimiter;
encrypt the concatenated sensitive data fields of each said business transaction using said symmetric key generating an encrypted data field for each of said business transactions;
create an encrypted payload including transaction records corresponding to said business transactions where each transaction record contains said non-sensitive data fields and said encrypted data field for sensitive data;
encrypt said symmetric key using the receiving financial institution's public key by asymmetrical cryptography generating piece(s) of cypher text known as encrypted symmetric key, and splitting said encrypted symmetric key into multiple lines if needed;
calculate a root hash for said payload and said encrypted symmetric key, while any techniques of which can be used, one common technique is Merkle Tree scheme where each said transaction record or each line of said symmetric key is hashed, then each pair of hashes is concatenated and hashed together, and then repeat the steps until there is only one hash (which is known as Merkle root) for the entire payload and the encrypted symmetric key;
creating a header containing at least a data field that includes said root hash, and possibly data fields of timestamp, and other elements;
calculate a mathematical summary of said header which in most cases is a hash value of said header serving as the mathematical summary of said leaf block.

According to an embodiment of the present invention, the systems may be configured to share a leaf block securely and publicly. If this approach is used, said application server at the sending financial institution is further configured to place said encrypted leaf block in said data storage device or network location. Said data storage device or network location is configured to be publicly accessible for anyone. Said application server at the receiving financial institution is further configured to access said encrypted leaf block, decipher said encrypted symmetric key using the receiving financial institution's private key, decipher said encrypted transaction records using the deciphered symmetric key, and generate a plaintext version of said encrypted leaf block.

An Example of Unencrypted Scenario

For an example of unencrypted scenario, there are two Financial Institutions A and C as depicted in FIG. 3. Financial Institution A (301) has customers of Alice (310), Adam (311), Bob (313) and so on; Financial Institution C (307) has customers of Bob (313), Eve (314), Amy (315) and so on. Note that Bob (313) is a customer of both financial institutions.

The account relationships are depicted in FIG. 1: Alice (101) has Account #1A (121), Bob (102) has Account #2A (122), and Adam (103) has Account #4A (123) in Financial Institution A (131). Bob (104, the same customer as 102) has Account #2C (124) in Financial Institution C (133) as well. Eve has Account #3C (125), and Amy has Account #5C (126) in Financial Institution C (133). Financial Institution A (131) has a Blockchain Account #A (141) where value is denoted as ABC, and Financial Institution C (133) has a Blockchain Account #C (143) where value is denoted as XYZ. Blockchain accounts are connected to one another through blockchain transactions. Note that customers do not interact with blockchain directly. Instead they interact with financial institutions which then interact with blockchain.

Now let's assume below transfers are requested:
1) Alice in Financial Institution (FI) A requests to transfer 100 coins to Bob in FI C.
2) Bob in FI A requests to transfer 200 coins to himself in FI C.
3) Bob in FI A requests to transfer 300 coins to Eve in FI C.
4) Adam in FI A requests to transfer 400 coins to Amy in FI C.

Below steps can be performed to complete the above requests:

Step 1—Financial institutions A and C maintain two types of accounts: blockchain accounts and customer accounts. Specifically, as shown in FIG. 1, Financial Institution A (131) maintains a blockchain account of #A (141), and customer accounts of #1A (121), #2A (122) and #4A (123) with Alice (101), Bob (102) and Adam (103) respectively. Financial Institution C (133) maintains a blockchain account of #C (141), and customer accounts of #2C (124), #3C (125) and #5C (126) with Bob (104), Eve (105) and Amy (106) respectively. To continue this example, let's assume that all accounts have a balance that is enough to complete hereafter transactions.

Step 2—Financial Institutions A, as a sending financial institution, creates a leaf block. Specifically, (1) it creates a payload containing four business transactions that correspond to the four requested transfers as depicted in Payload 208 of FIG. 2. Each transaction includes data fields of timestamp (Column #1), sender's customer account (Column #2), recipient's customer account (Column #3), transaction amount (Column #4) and memo (Column #5). Timestamp is relative value to the timestamp in the header. To be straightforward, the values of all customer account are denoted as customer name in this example. (2) It calculates a root hash of said payload to prevent any changes of said payload. A Merkle tree scheme is employed. As show in 217, each transaction is hashed (H #1-H #4), then each pair of hashes is concatenated and hashed together (H #12 & H #34), and then repeat the steps until there is only one hash (H #1234, which is known as Merkle root) for the entire payload of the leaf block. (3) It creates a header containing said root hash, timestamp, and other elements.

Step 3—Financial Institutions A, as the sending financial institution, calculates a mathematical summary for said leaf block. In this example, the header of the leaf block is hashed, and the hash value is a mathematical summary of the leaf block.

Step 4—Financial Institutions A, as the sending financial institution, creates a blockchain transaction as shown at the first record in payload 205 of Block #2003 in FIG. 2. The blockchain transaction corresponds to the summary of the leaf block #206. It logs a transfer of 1000 coins from the blockchain account of Financial Institution A to the blockchain account of Financial Institution C, where the transaction amount of 1000 equals to the sum of all business transactions (100+200+300+400) inside the leaf block of #206 assuming no miming fee will be charged. The blockchain transaction also includes a memo (MEMO1) which contains a data field (205 left) for holding the hash value (209) of the header 207 of the leaf block #206, and a data field (215 right) for storing unique resource identifier (URI) pointing to the location of corresponding leaf block.

Step 5—Financial institutions A, as the sending financial institution, submits said blockchain transaction to miners to be written on a blockchain (200).

Step 6—Financial institutions A, as the sending financial institution, shares the leaf block with the receiving financial institution, here as Financial institutions C. Specifically, (1) it places said leaf block in a secure and private location where no one can access it without authorization. (2) It implements authorization rule(s) to ensure only the receiving financial institution can access said leaf block by utilizing public key of the receiving financial institution. For example, Financial Institution A sets up a mechanism to ask any requestors to encrypt the hash of or part of the hash of the requested leaf block using their private key and send back the ciphertext. (3) It may receive access requests from any requestors with ciphertexts. (4) After receiving a ciphertext, Financial Institution A uses the receiving financial institution's public key to decipher it. If succeeded, Financial Institution A authorizes the access of the leaf block to the requestor. Otherwise Financial Institution A declines the request.

Step 7—After said blockchain transaction is available, Financial Institution C, as the receiving financial institution, accesses the leaf block through the URI provided in in MEMO1 (215, right) following the authorization rules that have been set up by Financial Institution A, and retrieve a copy of said leaf block.

Step 8—Financial Institution C, as the receiving financial institution, validates the data integrity including validation of transaction amounts, number of transactions, root hash and hash of the leaf blocks. After validation, Financial Institution C credits transaction amounts per the leaf block to corresponding customer accounts. Bob get credits of 100 and 200 coins from the first two transactions in the leaf block, Eve gets 300, and Amy get 400.

After these steps, all the transfer requests are fulfilled: Alice transferred 100 coins to Bob, Bob 200 to himself, Bob 300 to Eve, and Adam 400 to Amy. All these customers send and receive coins just in the same way the send and receive money in current systems like QuickPay®, or Zella® Transfer. They don't need to know anything about what is going behind the scene.

An Example of Encrypted Scenario

In this example, the account setups are the same with last example. Now let's assume the same transfers are requested:
1) Alice in Financial Institution (FI) A requests to transfer 100 coins to Bob in FI C.
2) Bob in FI A requests to transfer 200 coins to himself in FI C.
3) Bob in FI A requests to transfer 300 coins to Eve in FI C.
4) Adam in FIA requests to transfer 400 coins to Amy in FI C.

Below steps can be performed to complete the above requests:

Step 1—Financial Institutions A and C create and maintain two types of accounts: blockchain accounts and customer accounts. Specifically, as shown in FIG. 1, Financial Institution A (131) creates and maintains a blockchain account of #A (141), and customer accounts of #1A (121), #2A (122) and #4A (123) with Alice (101), Bob (102) and Adam (103) respectively. Financial Institution C (133) creates and maintains a blockchain account of #C (141), and customer accounts of #2C (124), #3C (125) and #5C (126) with Bob (104), Eve (105) and Amy (106) respectively. To continue this example, let's assume that all accounts have a balance that is enough to complete hereafter said transactions.

Step 2—Financial institutions A, as a sending financial institution, creates a leaf block where sensitive data are encrypted. Specially, (1) it generates a symmetric key. (2) It creates a plaintext version of a payload containing four business transactions that correspond to the four requested transfers. The payload of the leaf block is initially prepared in the same way as the unencrypted example depicted in Payload 208 of FIG. 2. Each transaction includes data fields of timestamp (Column #1), sender customer account (Column #2), recipient customer account (Column #3), transaction amount (Column #4) and memo (Column #5). After the initial preparation, nonsensitive data field(s) (Column #4) are separated from the sensitive data fields (Column #1, #2, #3 and #5) which are then concatenated. (3) Financial institutions A encrypts the concatenated sensitive data fields of each business transaction using said symmetric key generating an encrypted data field for each of said business transactions. (4) Financial institutions A creates an encrypted payload including transaction records corresponding to said business transactions where each transaction record contains said nonsensitive data field(s) and said encrypted data field for sensitive data. As shown in Payload 213, for each transaction record the first data field (Column #1) is the transaction amount which is a nonsensitive data field, and the second data field (Column #2) is a ciphertext of encrypted sensitive data of timestamp, sender's customer account, recipient's customer account, and transaction memo. (5) Financial institutions A encrypts said symmetric key using the receiving financial institution's public key by asymmetrical cryptography generating piece(s) of cypher text known as encrypted symmetric key. If a long symmetric key is used, it may be split to multiple short strings. The short strings are then encrypted using the public key of the receiving financial institution respectively generating multiple corresponding cyphertexts. All ciphertexts are concatenated with a delimitator. The ciphertext(s) of the encrypted symmetric key may be very long. In such a case, the ciphertext(s) may be split into multiple lines as show in the box of Encrypt. Symmetric Key 212 of FIG. 2. (6) Financial Institutions A calculates a root hash for said payload and said encrypted symmetric key. Specifically, in this example, each transaction is hashed (H #a-H #d), then each pair of hashes is concatenated and hashed together (H #ab & H #cd), and then repeat the steps until there is only one hash (H #abcd, which is known as Merkle root) for the entire payload of the leaf block. Similarly, each line of said encrypted symmetric key is hashed (H #L1 & H #L2), then each pair of hashes is concatenated and hashed together, and then repeat the steps until there is only one hash (H #L12, which is known as Merkle root) for the entire encrypted symmetric key. Finally, the two Merkle roots are concatenated and hashed together to generate the root hash (H #L12abcd). (7)—Financial Institutions A creates a header containing at least a data field that includes said root hash, timestamp, and other elements.

Step 3—Financial Institutions A, as the sending financial institution, hashes the header of the leaf block, and the hash value is used as a mathematical summary of the leaf block.

Step 4—Financial Institutions A, as the sending financial institution, creates a blockchain transaction as shown at the second record in payload 205 of Block #2003 in FIG. 2. The blockchain transaction corresponds to the summary of the leaf block 210. It logs a transfer of 1000 coins from the blockchain account of Financial Institution A to the blockchain account of Financial Institution C, where the transaction amount of 1000 equals to the sum of all business transactions (100+200+300+400) inside the leaf block of 210 assuming no miming fee is charged. The blockchain transaction also includes a memo (MEMO2) which contains a data field (216 left) holding the hash value (214) of the header 211 of leaf block 210, and a data field (216 right) storing unique resource identifier (URI) pointing to the location of corresponding leaf block.

Step 5—Financial institutions A, as the sending financial institution, submits said blockchain transaction to miners to be written on a blockchain (200).

Step 6—Financial institutions A shares the leaf block with Financial institutions C by placing said leaf block in a public location where anyone can access it.

Step 7—After the blockchain transaction is available, Financial Institution C, as the receiving financial institution, accesses the leaf block from the URI provided in MEMO2 (216, right). Since the leaf block is placed in a public location, no authentication is required. After retrieval of the leaf block, Financial Institution C needs to decipher it as it is an encrypted version. Specifically, Financial Institution C uses its private key to decipher the encrypted symmetric key first, and then use the plaintext of symmetric key to decipher all transactions inside the payload, which generates the plaintext of the leaf block.

Step 8—Financial Institution C validates the data integrity including validation of transaction amounts, number of transactions, root hash and hash of the leaf blocks. After validation, Financial Institution C credits transaction amounts per the leaf block to corresponding customer accounts. Bob get credits of 100 and 200 coins from the first two transactions in the leaf block, Eve gets 300, and Amy get 400.

After these steps, all the transfer requests are fulfilled: Alice transferred 100 coins to Bob, Bob 200 to himself, Bob 300 to Eve, and Adam 400 to Amy. All these customers send and receive coins just in the similar way they send and receive money in current systems like QuickPay®, or Zella® Transfer. They don't need to know anything about what is going behind the scene.

About two examples show a practical application of the present invention in money transfer between customers. Another application of the present invention is the payment solution. Most payment technologies require two-way data exchange: an acquirer of a merchant asks for an authorization from the issuer of a customer, and the customer's issuer needs to respond with approval or denial. The fund transfer is can be days lagging from the authorization. The present invention makes one-way data flow possible in the payment process. A customer can initiate a payment to a merchant from his/her issuer, and the merchant just wait dozens of milliseconds to couple of seconds for the confirmation of fund received from its acquirer. The data goes from the customer, to the issuer, then to the blockchain, then to the acquirer, and finally to the merchant. First advantage of this one-way data flow is that once confirmed, the fund is also transferred, and is immediately available for the merchant. Second advantage is that it makes international payment easier, because the solution does not require trust between financial institutions across boarder which is difficult to build. For example, a French shop sells products to American customers through an E-commerce website. If the shop and its foreign customers both are serviced by financial institutions that has implemented the present invention, then the payment can be easy. After selecting all products, customers can make a payment. The payment will be initialized by customers from their issuers. The payment transaction is then written into a leaf block, and then the leaf blocks is wrapped up and summarized to a blockchain transaction. Once the blockchain transaction is confirmed, it triggers the shop's acquirer to process the blockchain transaction and its leaf block, and credit corresponding fund to the shop, and finally notify the shop. After fund receipt confirmation, the shop can start processing customers' order. The two financial institutions—issuer of a customer and the acquirer of the shop—don't need to trust each other. This is very important because building a financial trust across borders is not easy.

Discussion

The present invention can be applied to most blockchain networks as long as they allow at least a transaction memo in any forms. Some blockchains do not explicitly include a data field called "memo" in a block transaction, but memos can be written into the blockchains using a few twists. For example, Bitcoin network does not have a memo data field for a transaction, but it has an operation code known as OP RETURN that allows writing said transaction memo of the present disclosure into a transaction. Ethereum network, for another example, has a data field known as "input data" that can be used to write said transaction memo. Some blockchains explicitly include a data field named memo that can be used directly, and no twists are required. Such blockchains include EOS, Bianance Coin (BNB), Cosmos (ATOM), and so on. Some blockchain have a data field like memo but is not called memo. They can be used as said transaction memo or be twisted to do so. For example, NEM (XEM) has a data field called Message that can be used as said transaction memo. Monero (XMR) has a data field called Payment ID that allows only hexadecimal characters, but it can be twisted to log said transaction memo. For those blockchains that do not have a data field that can be used directly or twisted to be used as said transaction memo, a modification to the blockchain protocol may be required in order to use the prevent invention.

Storing data on blockchain can be very expensive, and most blockchains allow only very limited amount of memo data. A hash value of a leaf block may be too long to be accommodated in a blockchain transaction memo. In this case, partial hash can be used. For example, only the latter half or even only last 10 letters of the hash value of a leaf block is written to a blockchain transaction memo. To further save space, a shortened URI may be used in transaction memo as well.

One drawback of the present disclosure in comparison with using blockchain only is that it requires all participated financial institutions to be trusted by their own customers. However, this will not be a problem, because it is not a problem in current banking systems, where a customer should trust a bank. Otherwise she/he will not be a customer of the bank. In order to win trust from customers, a financial institution should settle customers' cryptocurrency credit honestly and responsibly. Two advantages of the present invention over current banking system are that (1) it does not require the trust between financial institutions, and (2) it does not rely on clearing house to settle obligations. A leaf block that is referred in blockchain transaction(s) inherits the property of immutability from blockchain. If litigation is required to resolve disputes, a leaf block can be a good document of evidence in the court.

The present invention makes four primary improvements for blockchain. The first one is the scalability. It allows financial institutions to accumulate as many business transactions as they need within their own controlled environment before packaging them into a blockchain transaction. When there is increasingly large volume of business transactions within a short time period, a financial institution can simply increase the size of leaf blocks to handle the requirement of high throughput. Financial institutions take full control of scalability for business transactions as they control the size of leaf blocks. Since most business transactions are not on-chain, it also reduces the congestion of blockchain networks. The second improvement is the government regulation compliances. Since majority of consumer transactions rely on financial institutions, government regulations can be implemented as easy as for current fiat financial systems. Thirdly, it improves user experiences. Since consumers do not interact with blockchain, their experience of using cryptocurrency is the same with services they already enjoy in fiat system, which is much better than using digital wallets that is designed for blockchain transactions. Last but not least, it improves the settlement process. A blockchain transaction itself is a settlement for all the transactions inside its leaf block, which bypasses the clearing process, and accelerates settlement process.

What is claimed is:

1. A method of transferring cryptocurrency credits comprising the steps of:
   maintaining at least two types of accounts—one type of blockchain accounts for cryptocurrency and the other type of customer accounts for cryptocurrency credits;
   creating at least a leaf block, by a sending financial institution, which includes a plurality of business transactions that intend to transfer customers' cryptocurrency credits to customer accounts at a receiving financial institution where such inclusion does not limit to direct appearance but also includes business transactions that are directly or indirectly referred in said leaf block;
   calculating a mathematical summary for said leaf block by the sending financial institution, where said mathematical summary is a hash value of said leaf block;
   creating at least a blockchain transaction, by the sending financial institution, corresponding to said leaf block addressing to blockchain account(s) of the receiving financial institution where total cryptocurrency amount of said blockchain transaction is great enough to settle cryptocurrency credits that are intended to be transferred through said business transactions, and at least a part of said mathematical summary is referred in transaction memo(s) or any other data field(s) of said blockchain transaction;
   submitting said blockchain transaction, by the sending financial institution, to a blockchain network to be written on a blockchain;
   sharing said leaf block by the sending financial institution with the receiving financial institution;
   accessing said leaf block by the receiving financial institution after said blockchain transaction is available; and
   validating said leaf block and crediting transaction amounts in it to corresponding customer accounts by the receiving financial institution after said blockchain transaction is confirmed.

2. The method of claim 1, wherein a leaf block may be unencrypted, in which scenario, creating a leaf block and calculating a mathematical summary for said leaf block further comprising:
   creating a payload containing a plurality of business transactions where each transaction includes at least data fields of recipient's customer account and transaction amount, and optional data fields of timestamp, sender's customer account and transaction memo;
   calculating a root hash of said payload, while any techniques of which can be used, one common technique is Merkle Tree scheme where each transaction is hashed, then each pair of hashes is concatenated and hashed together, and then repeat the steps until there is only one hash (which is known as Merkle root) for the entire payload of the leaf block;
   creating a header containing at least a data field that includes said root hash, and optional data fields of timestamp, and other elements;
   calculating a mathematical summary of said header which is a hash value of said header serving as the mathematical summary of said leaf block.

3. The method of claim 1, wherein a leaf block may be encrypted, in which scenario, creating a leaf block and calculating a mathematical summary for said leaf block further comprising:
   generating a symmetric key;
   creating a plaintext version of a payload containing a plurality of business transactions where each transaction includes at least data fields of transaction amount and recipient's customer account, and optional data fields of timestamp, sender's customer account and transaction memo in an arrangement of separating nonsensitive data fields such as transaction amount from sensitive data fields such as customer accounts which are then concatenated with a delimiter;
   encrypting the concatenated sensitive data fields of each said business transaction using said symmetric key generating an encrypted data field for each of said business transactions;
   creating an encrypted payload including transaction records corresponding to said business transactions where each transaction record contains said nonsensitive data field(s) and said encrypted data field for sensitive data;
   encrypting said symmetric key using the receiving financial institution's public key by asymmetrical cryptography generating piece(s) of cypher text known as encrypted symmetric key, and splitting said encrypted symmetric key into multiple lines if needed;
   calculating a root hash for said payload and said encrypted symmetric key, while any techniques of which can be used, one common technique is Merkle Tree scheme where each said transaction record or each line of said encrypted symmetric key is hashed, then each pair of hashes is concatenated and hashed together, and then repeat the steps until there is only one hash (which is known as Merkle root) for the entire payload and the encrypted symmetric key;

creating a header containing at least a data field that includes said root hash, and optional data fields of timestamp, and other elements;

calculating a mathematical summary of said header which is a hash value of said header serving as the mathematical summary of said leaf block.

4. The method of claim 1, wherein creating said blockchain transaction further comprising a step to incorporate a unique resource identifier (URI) in transaction memo(s) or any other data field(s) of said blockchain transaction referring to a location where said leaf block can be accessed.

5. The method of claim 1, wherein sharing said leaf block by the sending financial institution with the receiving financial institution and accessing said leaf block by the receiving financial institution may be through private and secured channels, which further comprises:

placing said leaf block in a secure and private location by the sending financial institution;

implementing authorization rule(s) to ensure only the receiving financial institution can access said leaf block by utilizing public key of the receiving financial institution, for an example of which, the sending financial institution asks any requestors to encrypt a part of mathematical summary of said leaf block using their private key and send back the ciphertext;

requesting access by the receiving financial institution, for said example of which, the receiving financial institution encrypts a part of mathematic summary of said leaf block using its private key, and sends the ciphertext to the sending financial institution;

granting access by the sending financial institution to the receiving financial institution, for said example of which, after receiving the ciphertext from a requestor, the sending financial institution uses the receiving financial institution's public key to decipher the ciphertext, where if succeeded then it grants access of said leaf block to the requestor else denies the request; and accessing said leaf block by the receiving financial institution after said blockchain transaction is available.

6. The method of claim 1, wherein sharing said leaf block by the sending financial institution with the receiving financial institution and accessing said leaf block by the receiving financial institution may be through public channels for encrypted leaf blocks, which further comprises:

placing, by the sending financial institution, said leaf block which is encrypted and is referred to as encrypted leaf block hereafter, in a public location where anyone can access it;

accessing said encrypted leaf block by the receiving financial institution;

deciphering said encrypted symmetric key by the receiving financial institution using its private key;

deciphering said encrypted transaction records using the deciphered symmetric key; and generating a plaintext version of said encrypted leaf block.

7. A system of transferring cryptocurrency credits comprising:

at least a database at each participated financial institution configured to store blockchain accounts for cryptocurrency and customer accounts for cryptocurrency credits;

at least an application server at a sending financial institution that is configured to:

create at least a leaf block which includes a plurality of business transactions that intend to transfer customers' cryptocurrency credits to customer accounts at a receiving financial institution, calculate a mathematical summary for said leaf block where said mathematical summary is a hash value of said leaf block, create at least a blockchain transaction corresponding to said leaf block addressing to blockchain account(s) of the receiving financial institution where total cryptocurrency amount of said blockchain transaction is great enough to settle cryptocurrency credits that are intended to be transferred through said business transactions and at least a part of said mathematical summary is referred in transaction memo(s) or any other data field(s) of said blockchain transaction, submit said blockchain transaction to a blockchain network to be written on a blockchain, and share said leaf block with the receiving financial institution;

at least a blockchain network that can be used to write said blockchain transaction;

at least a data storage device or network location that is configured to store said leaf block and to share said leaf block with the receiving financial institution; and at least an application server at the receiving financial institution that is configured to access said blockchain transaction and said leaf block, and to validate said leaf block and credit transaction amounts inside said leaf block to corresponding customer accounts.

8. The system of claim 7, wherein said application server at the sending financial institution that is configured to create a leaf block which may be unencrypted and calculate a mathematical summary for said leaf block, being further configured to:

create a payload containing a plurality of business transactions where each transaction includes at least data fields of recipient's customer account and transaction amount, and optional data fields of timestamp, sender's customer account and transaction memo;

calculate a root hash of said payload, while any techniques of which can be used, one common technique is Merkle Tree scheme where each transaction is hashed, then each pair of hashes is concatenated and hashed together, and then repeat the steps until there is only one hash (which is known as Merkle root) for the entire payload of the leaf block;

create a header containing at least a data field that includes said root hash, and optional data fields of timestamp, and other elements; and calculate a mathematical summary of said header which is a hash value of said header serving as the mathematical summary of said leaf block.

9. The system of claim 7, wherein said application server at the sending financial institution that is configured to create a leaf block which may be encrypted, and calculate a mathematical summary for said leaf block, being further configured to:

generate a symmetric key;

create a plaintext version of a payload containing a plurality of business transactions where each transaction includes at least data fields of transaction amount and recipient's customer account, and optional data fields of timestamp, sender's customer account and transaction memo in an arrangement of separating nonsensitive data fields such as transaction amount from sensitive data fields such as customer accounts which are then concatenated with a delimiter;

encrypt the concatenated sensitive data fields of each said business transaction using said symmetric key generating an encrypted data field for each of said business transactions;

create an encrypted payload including transaction records corresponding to said business transactions where each transaction record contains said nonsensitive data fields and said encrypted data field for sensitive data;

encrypt said symmetric key using the receiving financial institution's public key by asymmetrical cryptography generating piece(s) of cypher text known as encrypted symmetric key, and splitting said encrypted symmetric key into multiple lines if needed;

calculate a root hash for said payload and said encrypted symmetric key, while any techniques of which can be used, one common technique is Merkle Tree scheme where each said transaction record or each line of said symmetric key is hashed, then each pair of hashes is concatenated and hashed together, and then repeat the steps until there is only one hash (which is known as Merkle root) for the entire payload and the encrypted symmetric key;

create a header containing at least a data field that includes said root hash, and optional data fields of timestamp, and other elements; and calculate a mathematical summary of said header which is a hash value of said header serving as the mathematical summary of said leaf block.

10. The system of claim 7, wherein said application server at the sending financial institution that is configured to create a blockchain transaction, being further configured to incorporate a unique resource identifier (URI) in transaction memo(s) or any other data field(s) of said blockchain transaction referring to a location where said leaf block can be accessed.

11. The system of claim 7, wherein said application server at the sending financial institution, said data storage device or network location, and said application server at the receiving financial institution are collaboratively configured to ensure only the receiving financial institution can access said leaf block other than the sending financial institution.

12. The system of claim 11,
wherein said application server at the sending financial institution is further configured to place said leaf block in said data storage device or network location;
wherein said data storage device or network location is further configured to implement authorization rule(s) to ensure only the receiving financial institution can access said leaf block by utilizing public key of the receiving financial institution, for an example of which, the sending financial institution asks any requestors to encrypt a part of mathematical summary of said leaf block using their private key and send back the ciphertext;
wherein said application server at the receiving financial institution is further configured to request access from the sending financial institution, for said example of which, the receiving financial institution encrypts a part of mathematic summary of said leaf block using its private key, and sends the ciphertext to the sending financial institution;
wherein said application server at the sending financial institution is further configured to grant access to the receiving financial institution, for said example of which, after receiving the ciphertext from a requestor, the sending financial institution uses the receiving financial institution's public key to decipher the ciphertext, where if succeeded then it grants access of said leaf block to the requestor else denies the request; and
wherein said application server at the receiving financial institution is further configured to access said leaf block.

13. The system of claim 9, wherein said application server at the sending financial institution, said data storage device or and network location, and said application server at the receiving financial institution are configured to ensure only the receiving financial institution can get a plaintext version of an encrypted leaf block being created by claim 9.

14. The system of claim 13,
wherein said application server at the sending financial institution is further configured to place said encrypted leaf block in said data storage device or network location;
wherein said data storage device or network location is configured to be publicly accessible for anyone; and
wherein said application server at the receiving financial institution is further configured to:
access said encrypted leaf block,
decipher said encrypted symmetric key using the receiving financial institution's private key,
decipher said encrypted transaction records using the deciphered symmetric key, and
generate a plaintext version of said encrypted leaf block.

* * * * *